(12) United States Patent
Chen et al.

(10) Patent No.: US 12,461,425 B2
(45) Date of Patent: Nov. 4, 2025

(54) PROJECTION DEVICE

(71) Applicant: Coretronic Corporation, Hsin-Chu (TW)

(72) Inventors: Wei-Hao Chen, Hsin-Chu (TW); Ken-Teng Peng, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 522 days.

(21) Appl. No.: 18/082,593

(22) Filed: Dec. 16, 2022

(65) Prior Publication Data

US 2023/0205047 A1 Jun. 29, 2023

(30) Foreign Application Priority Data

Dec. 27, 2021 (CN) ............... 202111610821.3

(51) Int. Cl.
*G03B 5/00* (2021.01)
*G02B 26/08* (2006.01)
*G03B 21/14* (2006.01)

(52) U.S. Cl.
CPC ........... *G03B 5/00* (2013.01); *G02B 26/0883* (2013.01); *G03B 21/14* (2013.01); *G03B 2205/0053* (2013.01)

(58) Field of Classification Search
CPC .. G03B 21/005; G03B 21/006; G03B 21/008; G03B 21/14; G03B 21/20; G03B 21/28; G03B 21/142; G03B 21/145; G02B 5/00; G02B 5/04; G02B 5/045; G02B 5/10; G02B 26/00; G02B 26/08; G02B 26/0883;
(Continued)

(56) References Cited

U.S. PATENT DOCUMENTS

| 2005/0178948 | A1* | 8/2005 | Lee ................. | H04N 5/7416 348/E5.139 |
| 2015/0268538 | A1* | 9/2015 | Gyoten ............ | G03B 21/142 353/22 |
| 2020/0004124 | A1* | 1/2020 | Chen ............... | G03B 21/005 |

FOREIGN PATENT DOCUMENTS

| CN | 1112688 | 11/1995 |
| CN | 101101372 | 1/2008 |
| CN | 105991983 | 4/2019 |

(Continued)

OTHER PUBLICATIONS

"Office Action of China Counterpart Application", issued on Jul. 2, 2025, p. 1-p. 5.

*Primary Examiner* — Sultan Chowdhury
(74) *Attorney, Agent, or Firm* — JCIPRNET (57) ABSTRACT

A projection device includes: an illumination system providing an illumination beam; a light valve arranged on a transmission path of the illumination beam and converting the illumination beam into an image beam; a projection lens arranged on a transmission path of the image beam and projecting the image beam out of the projection device; a first actuating module connecting and moving a first element, so that the image beam shifts back and forth along at least one of the first, second, and third directions; and a second actuating module connecting and moving a second element, so that the image beam shifts back and forth along at least one of the first, second, and third directions. The first and second directions are perpendicular. The third and first directions form an angle of 45 degrees, so do the third and second directions. The first and second elements are different.

11 Claims, 10 Drawing Sheets

(58) Field of Classification Search
CPC ............. G02B 26/0891; H04N 9/3141; H04N 9/3152; H04N 9/3158; H04N 9/3161
See application file for complete search history.

(56) References Cited

FOREIGN PATENT DOCUMENTS

| | | |
|---|---|---|
| CN | 209373339 | 9/2019 |
| CN | 111766674 | 10/2020 |
| JP | 2003337272 | 11/2003 |
| JP | 2007248721 | 9/2007 |
| TW | I283793 | 7/2007 |

\* cited by examiner

PROJECTION DEVICE

CROSS-REFERENCE TO RELATED APPLICATION

This application claims the priority benefit of China application serial no. 202111610821.3, filed on Dec. 27, 2021. The entirety of the above-mentioned patent application is hereby incorporated by reference herein and made a part of this specification.

BACKGROUND

Technical Field

The disclosure relates to an optical device that is repeatedly moved, and particularly relates to a projection device including the optical device.

Description of Related Art

A projector is a display device used to provide large-scale images, and has been constantly improving as the technology evolves. The imaging principle of the projector is to convert an illumination beam generated by an illumination system into an image beam through a light valve, and then project the image beam to a projection target (such as a screen or a wall) through a projection lens to form a projection image.

As the image quality of video streaming on cable TV or the Internet improves, there is a growing demand for high-resolution projectors. In order to increase the resolution of the projector, an actuator is used, which can be put at a proper position in the projector for the beam generated by the projector to pass through an optical element on the actuator. When the actuator is actuated, the optical element carried by the actuator can oscillate back and forth, so as to project the beam passing through the optical element to different positions, thereby achieving the effect of increasing the resolution of the image projected by the projector. Most of the actuators on the market now are uniaxial actuators or biaxial actuators.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

An embodiment of the disclosure provides a projection device that provides a high-resolution projection image and has a small size. An embodiment of the disclosure provides a projection device, including: an illumination system configured to provide an illumination beam; a light valve arranged on a transmission path of the illumination beam and configured to convert the illumination beam into an image beam; a projection lens arranged on a transmission path of the image beam and configured to project the image beam out of the projection device; a first actuating module connected to a first element in a first group and moving the first element, so that the image beam shifts back and forth along at least one of a first direction, a second direction, and a third direction respectively; and a second actuating module connected to a second element in a second group and moving the second element, so that the image beam shifts back and forth along at least one of the first direction, the second direction, and the third direction respectively. The first direction and the second direction are perpendicular to each other, the third direction and the first direction form an angle of 45 degrees, and the third direction and the second direction form an angle of 45 degrees. The first element in the first group is one of the light valve, a flat plate light-transmitting element, a prism module, and the projection lens. The second element in the second group is one of the light valve, the flat plate light-transmitting element, the prism module, and the projection lens. The first actuating module and the second actuating module are respectively connected to different elements. The first element is different from the second element.

In an embodiment of the disclosure, the first actuating module includes a first control element and a first driving element, and the second actuating module includes a second control element and a second driving element.

In an embodiment of the disclosure, the first element in the first group is the light valve, the second element in the second group is the projection lens, the first actuating module is connected to the light valve, the light valve is actuated by the first actuating module to shift back and forth along the first direction and the second direction respectively, the second actuating module is connected to the projection lens, and the projection lens is actuated by the second actuating module to shift back and forth along the third direction.

In an embodiment of the disclosure, the first element in the first group is the light valve, the second element in the second group is the projection lens, the first actuating module is connected to the light valve, the light valve is actuated by the first actuating module to shift back and forth along the third direction, the second actuating module is connected to the projection lens, and the projection lens is actuated by the second actuating module to shift back and forth along the first direction and the second direction respectively.

In an embodiment of the disclosure, the first element in the first group is the light valve, the second element in the second group is the projection lens, the first actuating module is connected to the light valve, the light valve is actuated by the first actuating module to shift back and forth along the first direction and the second direction respectively, the second actuating module is connected to the projection lens, and the projection lens is actuated by the second actuating module to shift back and forth along the first direction and the second direction respectively.

In an embodiment of the disclosure, the first element in the first group is the light valve, the second element in the second group is the prism module, the first actuating module is connected to the light valve, the light valve is actuated by the first actuating module to shift back and forth along the first direction and the second direction respectively, the second actuating module is connected to the prism module, and the prism module is actuated by the second actuating module to oscillate back and forth around a first rotation axis.

In an embodiment of the disclosure, the first element in the first group is the prism module, the second element in the second group is the projection lens, the first actuating module is connected to the prism module, the prism module is actuated by the first actuating module to oscillate back and forth around a first rotation axis, the second actuating module is connected to the projection lens, and the projection lens is actuated by the second actuating module to shift back and forth along the first direction and the second direction respectively.

In an embodiment of the disclosure, the first element in the first group is the light valve, the second element in the second group is the flat plate light-transmitting element, the first actuating module is connected to the light valve, the light valve is actuated by the first actuating module to shift back and forth along the first direction and the second direction, the second actuating module is connected to the flat plate light-transmitting element, and the flat plate light-transmitting element is actuated by the second actuating module to oscillate back and forth around a second rotation axis.

In an embodiment of the disclosure, the first element in the first group is the light valve, the second element in the second group is the flat plate light-transmitting element, the first actuating module is connected to the light valve, the light valve is actuated by the first actuating module to shift back and forth along the third direction, the second actuating module is connected to the flat plate light-transmitting element, and the flat plate light-transmitting element is actuated by the second actuating module to oscillate back and forth around a second rotation axis and a third rotation axis respectively. The second rotation axis is perpendicular to the third rotation axis.

In an embodiment of the disclosure, the first element in the first group is the flat plate light-transmitting element, the second element in the second group is the projection lens, the first actuating module is connected to the flat plate light-transmitting element, the flat plate light-transmitting element is actuated by the first actuating module to oscillate back and forth around a second rotation axis and a third rotation axis respectively, the second actuating module is connected to the projection lens, and the projection lens is actuated by the second actuating module to shift back and forth along the third direction.

In an embodiment of the disclosure, the first driving element and the second driving element are voice coil motors, electromagnets or piezoelectric material structures.

Based on the above, in the projection device of the disclosure, the first actuating module is connected to the first element in the first group and moves the first element so as to shift the image beam back and forth along at least one of the first direction, the second direction, and the third direction respectively. The second actuating module is connected to the second element in the second group and moves the second element so as to shift the image beam back and forth along at least one of the first direction, the second direction, and the third direction respectively. The first direction and the second direction are perpendicular to each other. The third direction and the first direction form an angle of 45 degrees, and the third direction and the second direction form an angle of 45 degrees. Accordingly, the projection device can operate in multiple directions by shifting the image beam in multiple different directions, which improves the resolution of the image projected from the projection device to the projection target. Furthermore, actuating devices for the beam to shift in multiple different directions may be omitted to reduce the size and cost of the projection device.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
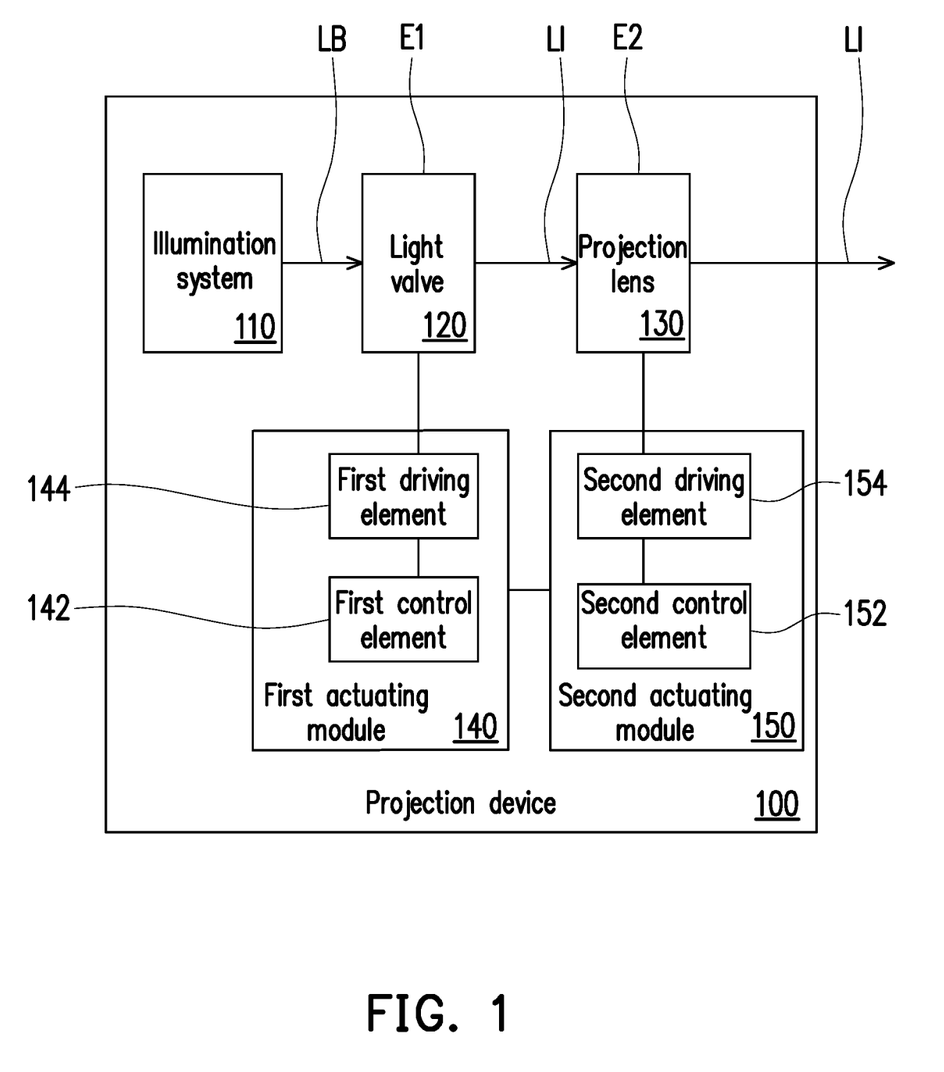
FIG. 1 is a schematic block diagram of a projection device according to an embodiment of the disclosure.

FIG. 1 is a schematic block diagram of a projection device according to an embodiment of the disclosure. Referring to FIG. 1, the present embodiment provides a projection device 100 including an illumination system 110, a light valve 120, a projection lens 130, a first actuating module 140, and a second actuating module 150. The illumination system 110 is configured to provide an illumination beam LB. The light valve 120 is arranged on a transmission path of the illumination beam LB and is configured to convert the illumination beam LB into an image beam LI. The projection lens 130 is arranged on a transmission path of the image beam LI and is configured to project the image beam LI out of the projection device 100 to a projection target (not shown), such as a screen or a wall. The projection device 100 of FIG. 1 is a non-telecentric projection system. In other embodiments, the projection device 100 of FIG. 1 may be a telecentric projection system, in which a prism module 160 is arranged between the light valve 120 and the projection lens 130 on the transmission path of the image beam LI.

The illumination system 110 is configured to provide the illumination beam LI. For example, in the present embodiment, the illumination system 110 is composed of, for example, a plurality of light emitting elements, a wavelength conversion element, a light uniformizing element, a filter element, and a plurality of light splitting/combining elements for providing lights of different wavelengths to form the illumination beam LB. The plurality of light emitting elements are, for example, light emitting diodes (LEDs) or laser diodes (LDs). The wavelength conversion element is, for example, a phosphor wheel. The light uniformizing element is, for example, an integrated rod or a lens array. The filter element is, for example, a color wheel. The light splitting/combining elements are, for example, dichroic mirrors. However, the disclosure is not intended to limit the illumination system 110 in the projection device 100 to certain types or forms, and the detailed structure and implementation thereof are adequately taught, suggested, and described in the common knowledge in the technical field and thus will not be repeated here.

The light valve 120 is, for example, a reflective optical modulator such as a liquid crystal on silicon panel (LCoS panel) and a digital micro-mirror device (DMD). In some embodiments, the light valve 120 may be a transmissive optical modulator such as a transparent liquid crystal panel, an electro-optical modulator, a magneto-optic modulator, and an acousto-optic modulator (AOM). The disclosure is not intended to limit the light valve 120 to certain types or forms. Regarding how the light valve 120 converts the illumination beam LB into the image beam LI, the detailed steps and implementation thereof are adequately taught, suggested, and described in the common knowledge in the technical field and thus will not be repeated here.

The projection lens 130 includes, for example, one or a combination of multiple optical lens elements having dioptric powers, for example, various combinations of non-planar lens elements such as bi-concave lens elements, bi-convex lens elements, concave-convex lens elements, convex-concave lens elements, plano-convex lens elements, and plano-concave lens elements. In an embodiment, the projection lens 130 may further include a planar optical lens element, which projects the image beam LI from the light valve 120 to the projection target in a reflective manner. The disclosure is not intended to limit the projection lens 130 to certain types or forms.

Figure 2:
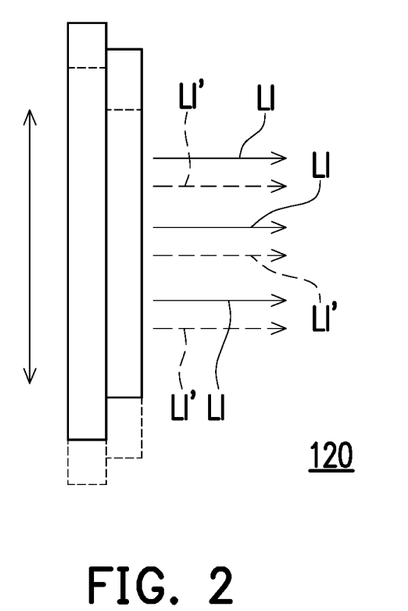
FIG. 2 is a schematic diagram showing how a light valve operates according to an embodiment of the disclosure.
Figure 3:
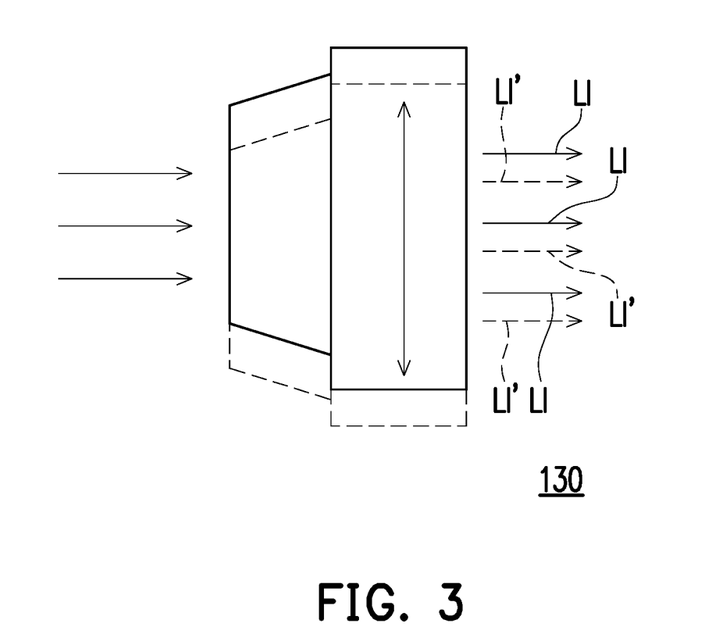
FIG. 3 is a schematic diagram showing how a projection lens operates according to an embodiment of the disclosure.
Figure 4:
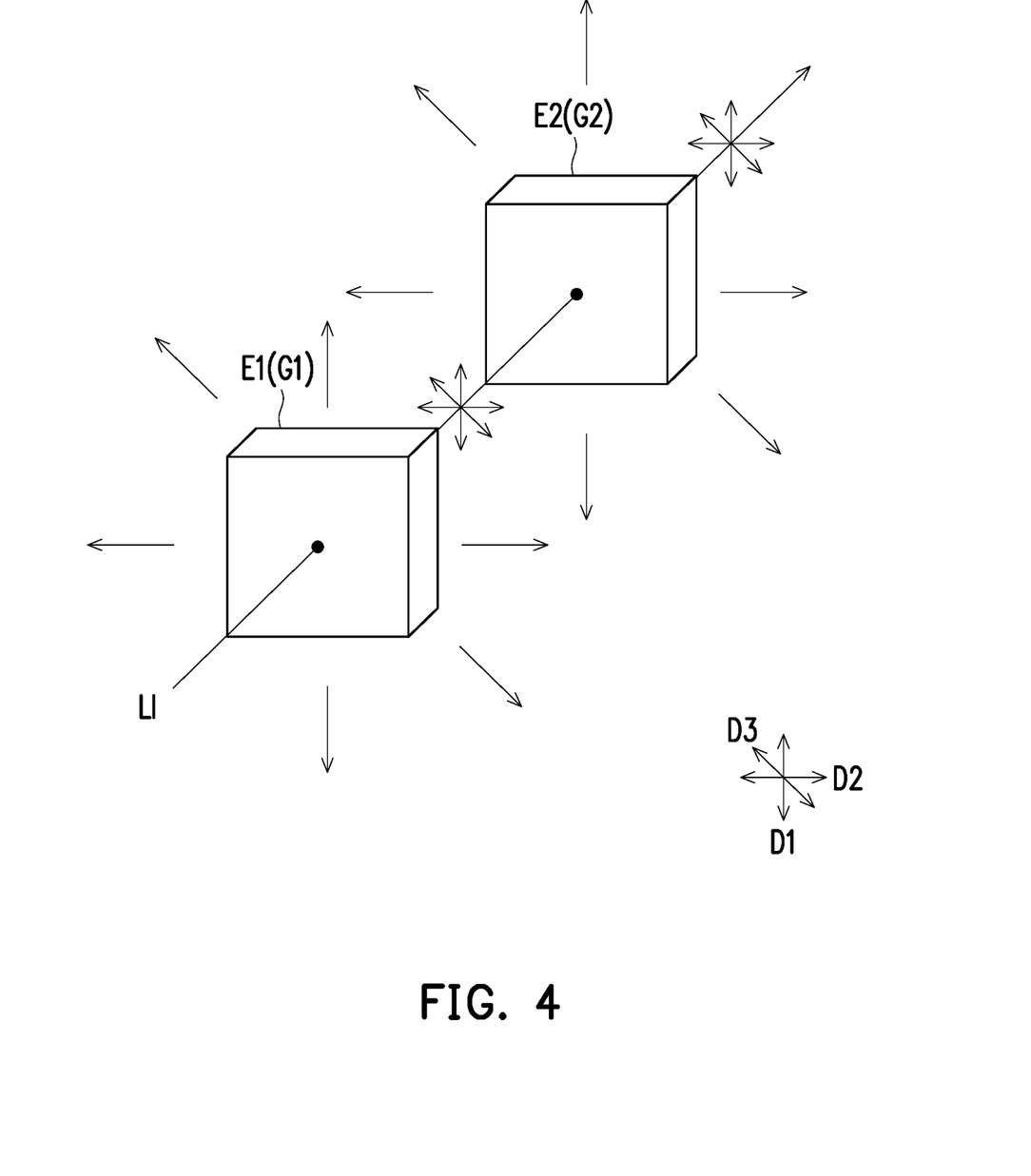
FIG. 4 is a schematic diagram showing movement of a first element in a first group and movement of a second element in a second group according to an embodiment of the disclosure.

FIG. 2 is a schematic diagram showing how the light valve operates according to an embodiment of the disclosure. FIG. 3 is a schematic diagram showing how the projection lens operates according to an embodiment of the disclosure. FIG. 4 is a schematic diagram showing movement of a first element in a first group and movement of a second element in a second group according to an embodiment of the disclosure. The moving described below includes one of shifting and oscillating. Referring to FIG. 1 and FIG. 4 first, the first actuating module 140 is connected to a first element E1 in a first group G1 for driving the first element E1 to move, so that the first element E1 can shift back and forth along at least one of a first direction D1 and a second direction D2. In other embodiments, the first actuating module 140 is connected to the first element E1 in the first group G1 for driving the first element E1 to move, so that the first element E1 can shift back and forth along a third direction D3. The first direction D1 and the second direction D2 are perpendicular to each other. The third direction D3 and the first direction D1 form an angle of 45 degrees, the third direction D3 and the second direction D2 form an angle of 45 degrees, and the first direction D1, the second direction D2, and the third direction D3 and the light transmission path of the image beam LI projected by the light valve 120 are perpendicular to one another. In other words, the first actuating module 140 is connected to the first element E1 in the first group for driving the first element E1. Through the movement of the first element E1, the image beam LI shifts back and forth along the first direction D1 and shifts back and forth along the second direction D2 respectively.

In the present embodiment, the first element E1 in the first group G1 includes, for example, the above-mentioned light valve 120. However, in different embodiments, the first group G1 is a set of all the optical elements in the projection device 100 that can be connected to the first actuating module 140, and the first group G1 includes, for example, a light valve, a flat plate light-transmitting element (such as a flat plate glass or a flat plate light-transmitting plastic sheet), a prism module or a projection lens, which will be exemplified in the following paragraphs.

In the present embodiment, the first actuating module 140 includes a first control element 142 and a first driving element 144. The first control element 142 is, for example, a central processing unit (CPU), other programmable general-purpose or special-purpose microprocessors, other similar elements or a combination of the above-mentioned elements. The first control element 142 is configured to provide a control signal to the first driving element 144. The first driving element 144 is, for example, a voice coil motor, an electromagnet or a piezoelectric material structure and is configured to cause the first element E1 to shift or oscillate according to the control signal. For example, as shown in FIG. 1, in the present embodiment, the first element E1 is the light valve 120, and the light valve 120 is actuated by the first actuating module 140 to shift back and forth, so that the image beam LI shifts to form an image beam LI' as shown in FIG. 2. As shown in FIG. 2, through the movement of the light valve 120, the image beam LI' is formed by shifting the light valve 120 back and forth along at least one of the first direction D1 and the second direction D2, or shifting the light valve 120 back and forth along the third direction D3, as shown in FIG. 4.

Furthermore, the second actuating module 150 is connected to a second element E2 in a second group G2, so that when the image beam LI passes through the second element E2, the second actuating module 150 drives the second element E2 to shift back and forth along at least one of the first direction D1 and the second direction D2, or drives the second element E2 to shift back and forth along the third direction D3. The first actuating module 140 and the second actuating module 150 are respectively connected to different optical elements. That is, the first element E1 and the second element E2 are different optical elements. In the present embodiment, the second group G2 includes, for example, a light valve, a flat plate light-transmitting element (such as a flat plate glass or a flat plate light-transmitting plastic sheet), a prism module or a projection lens. However, in different embodiments, the second group G2 is a set of all the optical elements in the projection device 100 that can be connected to the second actuating module 150. In the present embodiment, the second actuating module 150 includes a second control element 152 and a second driving element 154. The second control element 152 is similar to the first control element 142 and is configured to provide a control signal to the second driving element 154, and the second driving element 154 is similar to the first driving element 144 and is configured to cause the second element E2 to shift or oscillate according to the control signal. For example, as shown in FIG. 1, in the present embodiment, the second element E2 is the projection lens 130, and the projection lens 130 is actuated by the second actuating module 150 to shift back and forth, so that the beam passing through the projection lens 130 forms the image beams LI and LI' as shown in FIG. 3. As shown in FIG. 3, through the movement of the projection lens 130, the image beam LI' is formed by shifting the projection lens 130 back and forth along at least one of the first direction D1 and the second direction D2, or shifting the projection lens 130 back and forth along the third direction D3, as shown in FIG. 4. It is also worth mentioning that the second actuating module 150 may be connected to the inside of the projection lens 130 to control the back and forth shifting of one of the lens elements in the projection lens 130, but the disclosure is not limited thereto. The first actuating module 140 is connected to the second actuating module 150 to cooperate with each other, so that the light path of the projected image beam LI can be changed to increase the resolution of the image.

For example, in the present embodiment, as shown in FIG. 4, the image beam LI is shifted back and forth along the first direction D1 and shifted back and forth along the second direction D2 through the movement of the first element E1, and the image beam LI is shifted back and forth along the third direction D3 through the movement of the second element E2. Therefore, the first element E1 and the second element E2 can shift back and forth in three different directions to improve the resolution of the image formed by the image beam LI projected to the projection target by the projection device 100. In addition, there is no need to configure multiple actuating devices for shifting the beam in three different directions, and therefore the size and cost of the projection device 100 can be reduced.

Figure 5:
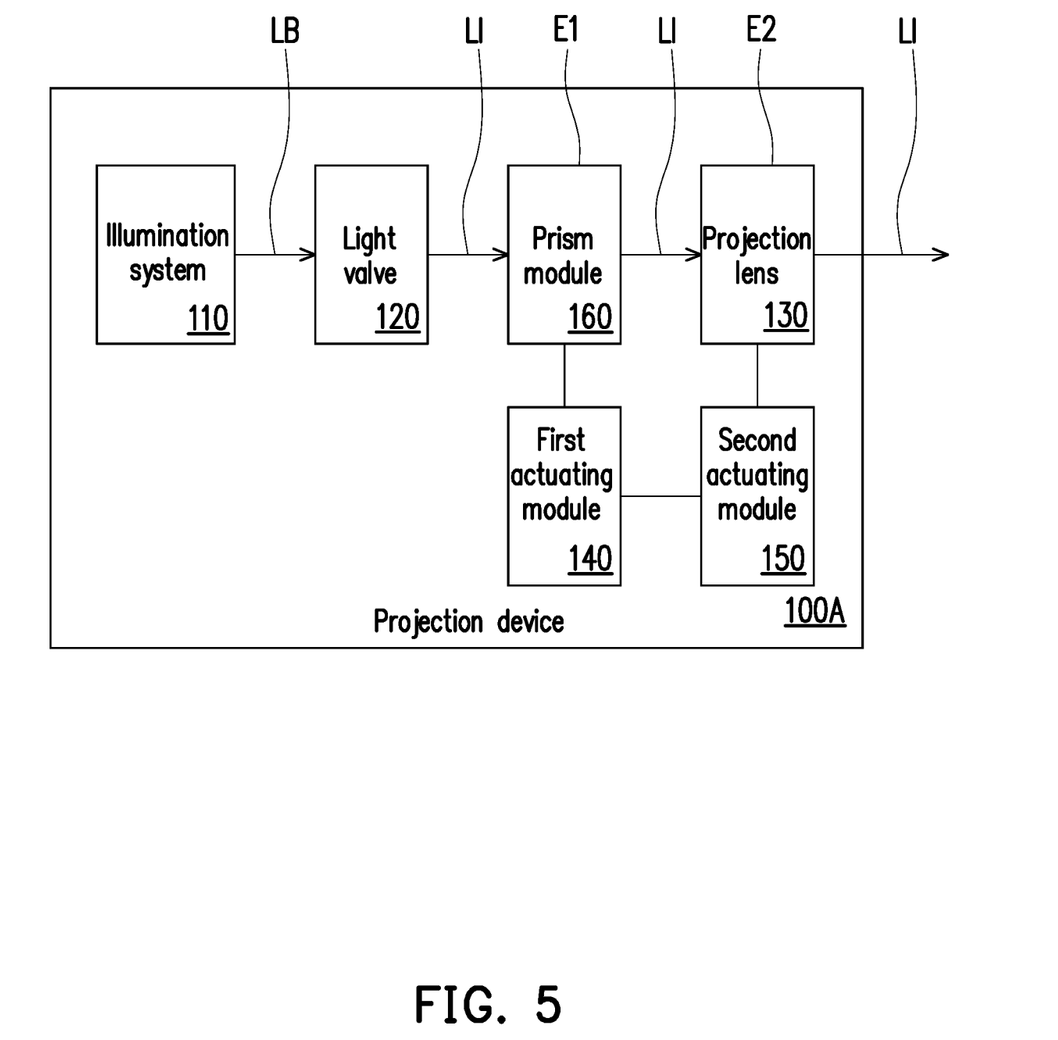
FIG. 5 is a schematic block diagram of a projection device according to another embodiment of the disclosure.
Figure 6:
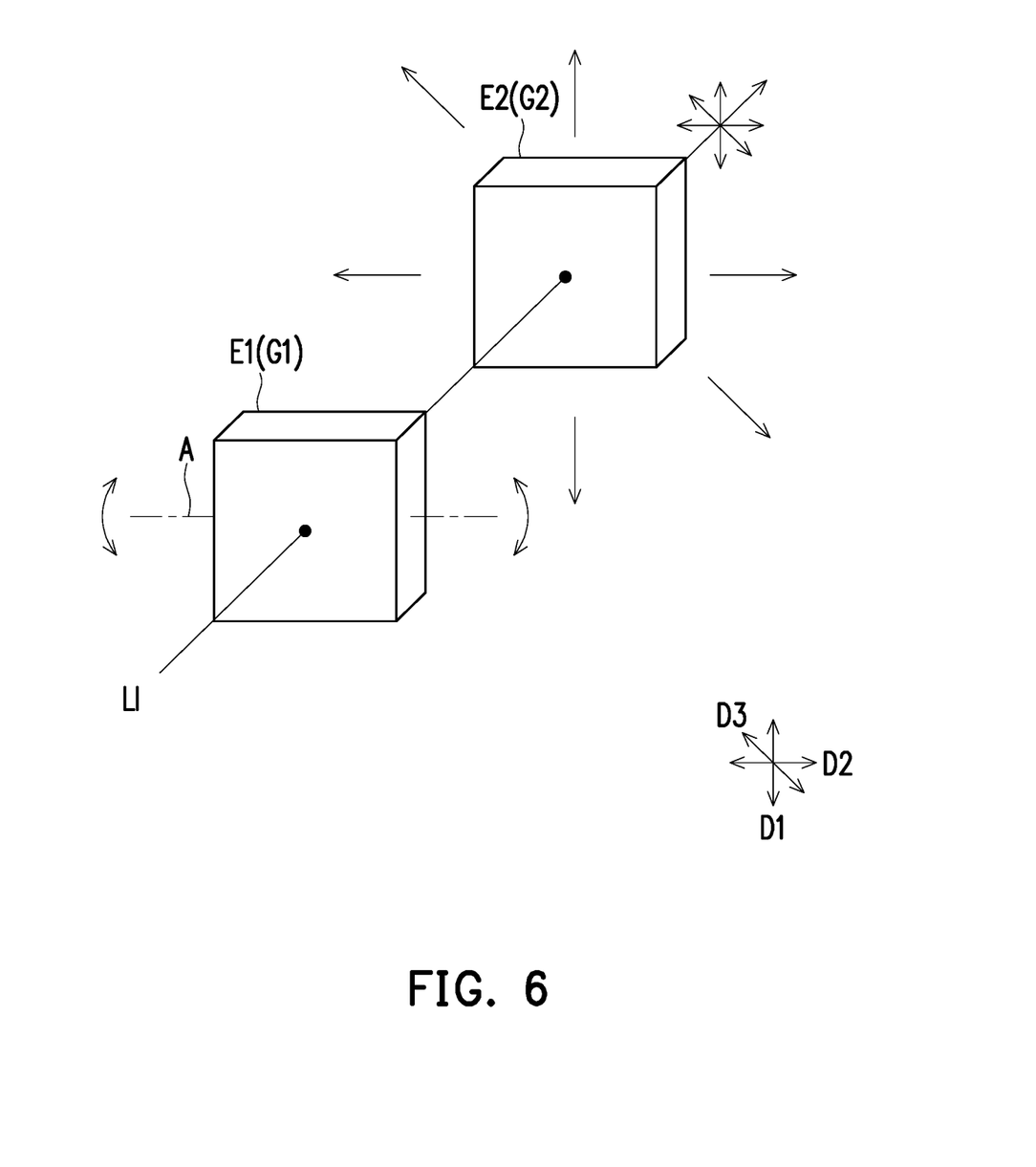
FIG. 6 is a schematic diagram showing movement of a first element in a first group and movement of a second element in a second group according to another embodiment of the disclosure.
Figure 8:
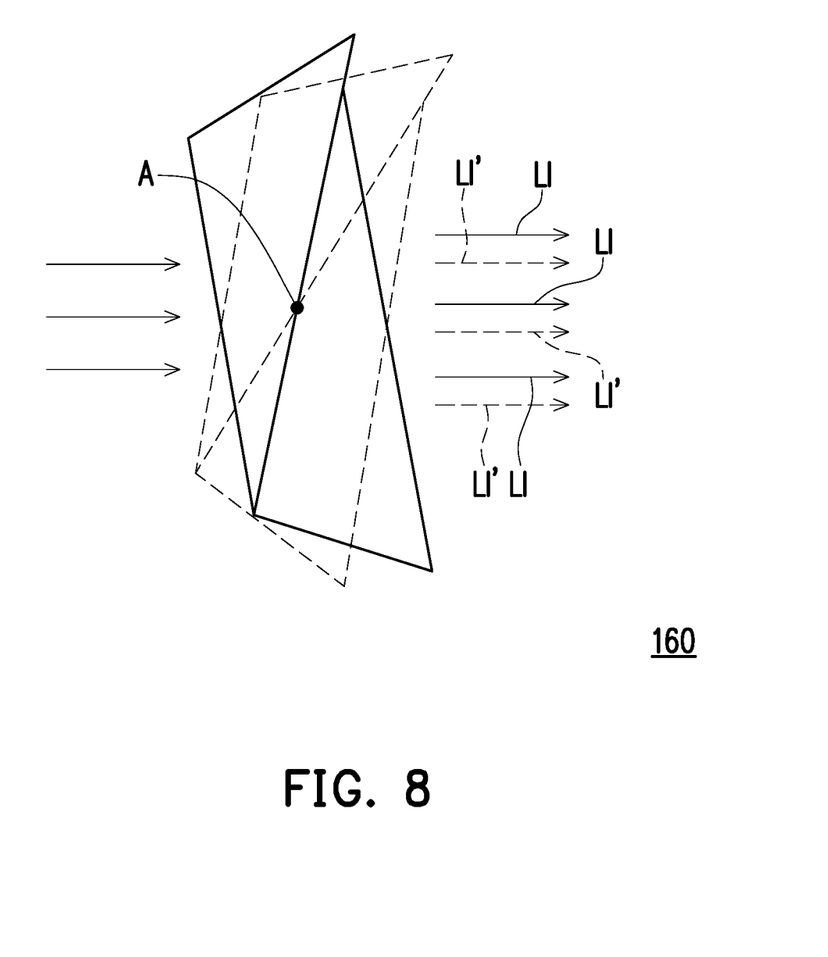
FIG. 8 is a schematic diagram showing how a prism module operates according to an embodiment of the disclosure.

FIG. 5 is a schematic block diagram of a projection device according to another embodiment of the disclosure. FIG. 6 is a schematic diagram showing movement of a first element in a first group and movement of a second element in a second group according to another embodiment of the disclosure. FIG. 8 is a schematic diagram showing how a prism module operates according to an embodiment of the disclosure. Referring to FIG. 5, FIG. 6, and FIG. 8, a projection device 100A of the present embodiment is similar to the projection device 100 shown in FIG. 1. The difference between the two devices lies in that, in the present embodiment, the projection device 100A further includes a prism module 160. On the transmission path of the image beam LI, the prism module 160 is arranged between the light valve 120 and the projection lens 130. The first actuating module 140 is connected to the prism module 160, and the second actuating module 150 is connected to the projection lens 130. In other words, in the present embodiment, the first element E1 is the prism module 160 and the second element E2 is the projection lens 130. The prism module 160 is actuated by the first actuating module 140 to oscillate back and forth around a first rotation axis A, so that the beam passing through the prism module 160 forms the image beams LI and LI' as shown in FIG. 8. The projection lens 130 is actuated by the second actuating module 150 to shift back and forth, so that the beam passing through the projection lens 130 forms the image beams LI and LI' as shown in FIG. 3. As shown in FIG. 3, the image beam LI' is formed by shifting the projection lens 130 back and forth along at least one of the first direction D1 and the second direction D2, or shifting the projection lens 130 back and forth along the third direction D3, as shown in FIG. 6. Therefore, the resolution of the image formed by the image beam LI projected to the projection target by the projection device 100A is improved. The first rotation axis A is perpendicular to the traveling path of the image beam LI, and the first rotation axis A is perpendicular to the first direction D1 and parallel to the second direction D2.

Figure 7:
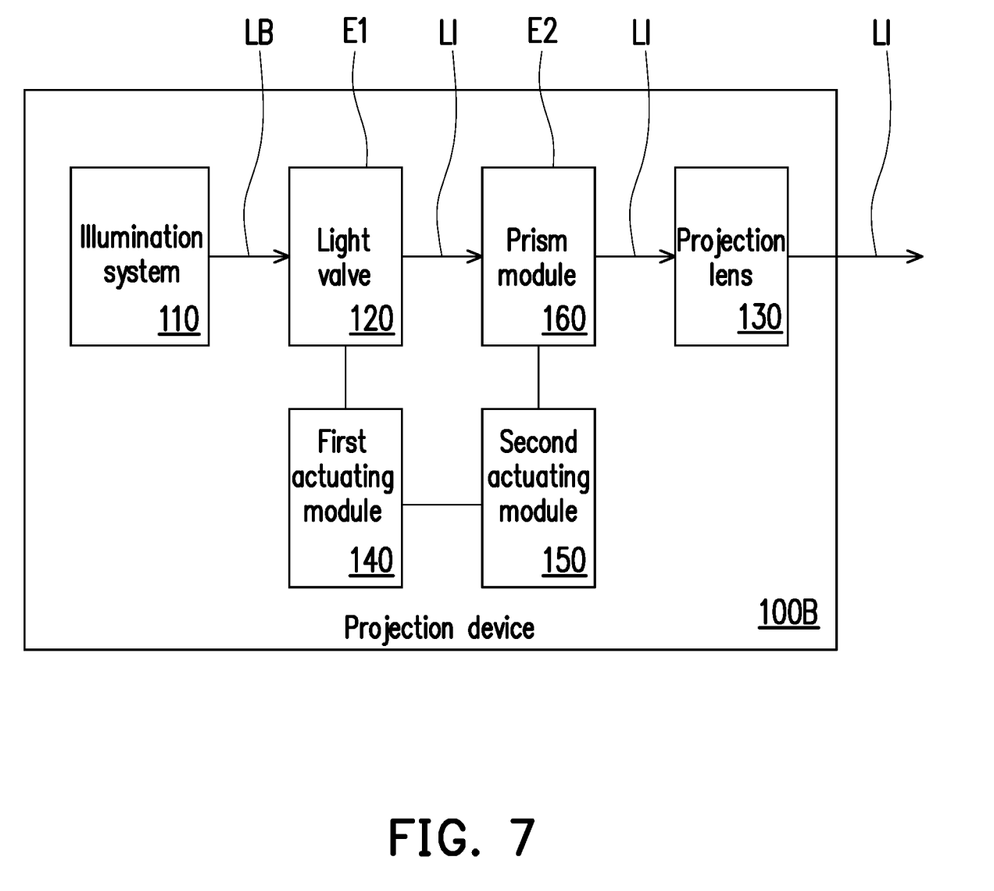
FIG. 7 is a schematic block diagram of a projection device according to another embodiment of the disclosure.

FIG. 7 is a schematic block diagram of a projection device according to another embodiment of the disclosure. FIG. 8 is a schematic diagram showing how a prism module operates according to an embodiment of the disclosure. Referring to FIG. 7 and FIG. 8, a projection device 100B of the present embodiment is similar to the projection device 100 shown in FIG. 1. The difference between the two devices lies in that, in the present embodiment, the projection device 100B further includes a prism module 160, and the second actuating module 150 is connected to the prism module 160. In other words, in the present embodiment, the first actuating module 140 is connected to the first element E1, the first element E1 is the light valve 120, the second element E2 is the prism module 160, and the prism module 160 is actuated by the second actuating module 150 to oscillate back and forth around the first rotation axis A, so that the beam passing through the prism module 160 forms the image beams LI and LI' as shown in FIG. 8. Therefore, the first element E1 and the second element E2 can be shifted or oscillated in multiple different directions to shift the image beam LI in multiple directions, which improves the resolution of the image formed by the image beam LI projected to the projection target by the projection device 100B.

Figure 9:
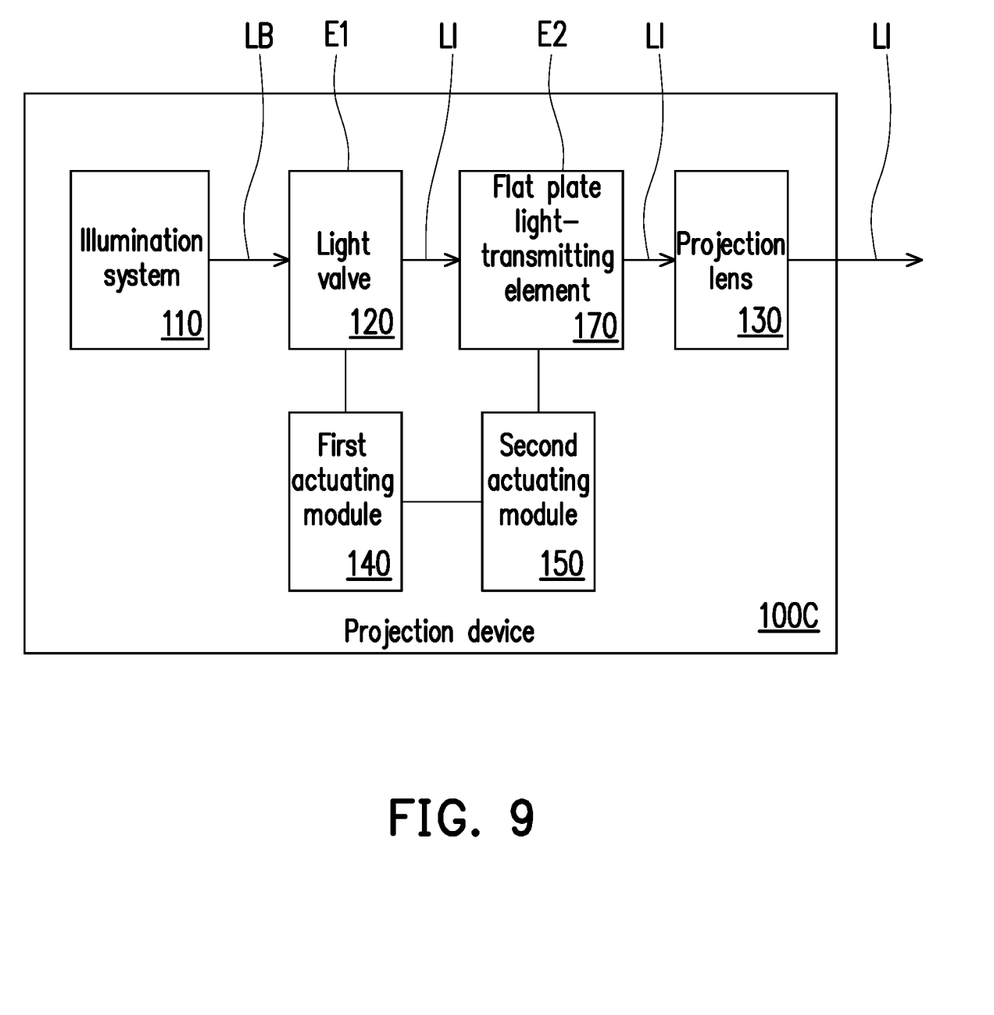
FIG. 9 is a schematic block diagram of a projection device according to another embodiment of the disclosure.
Figure 10:
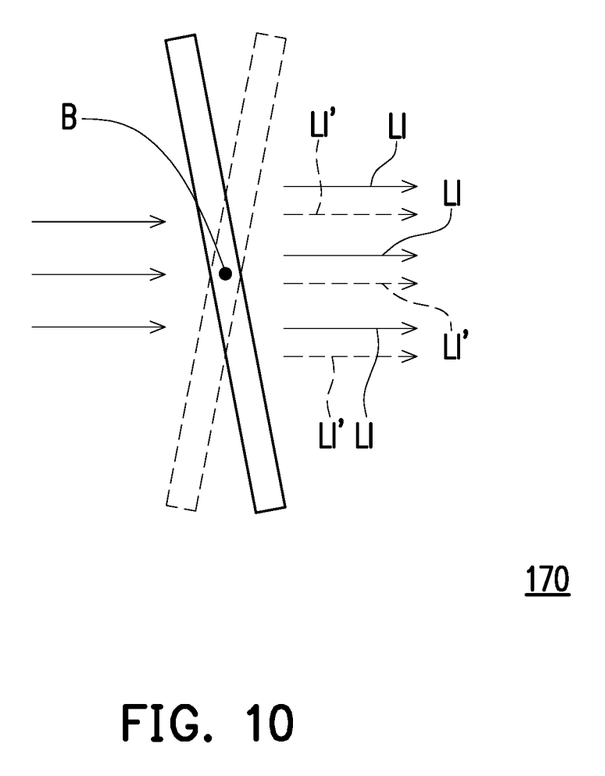
FIG. 10 is a schematic diagram showing how a flat plate light-transmitting element operates according to an embodiment of the disclosure.

FIG. 9 is a schematic block diagram of a projection device according to another embodiment of the disclosure. FIG. 10 is a schematic diagram showing how a flat plate light-transmitting element operates according to an embodiment of the disclosure. Referring to FIG. 9 and FIG. 10, a projection device 100C of the present embodiment is similar to the projection device 100 shown in FIG. 1. The difference between the two devices lies in that, in the present embodiment, the projection device 100C further includes a flat plate light-transmitting element 170, and the second actuating module 150 is connected to the flat plate light-transmitting element 170. In other words, in the present embodiment, the first actuating module 140 is connected to the light valve 120. The first element E1 is the light valve 120, the second element E2 is the flat plate light-transmitting element 170, and the flat plate light-transmitting element 170 is actuated by the second actuating module 150 to oscillate back and forth around a second rotation axis B, so that the beam passing through the flat plate light-transmitting element 170 forms the image beams LI and LI' as shown in FIG. 10. Therefore, the first element E1 and the second element E2 can be shifted and oscillated in multiple different directions to change the light path of the image beam L1 projected by the projection device 100C, which improves the resolution of the image formed by the image beam LI projected to the projection target by the projection device 100C. In other embodiments, the flat plate light-transmitting element 170 is actuated by the second actuating module 150 to oscillate back and forth around the second rotation axis B and a third rotation axis C (not shown). The second rotation axis B and the third rotation axis C are perpendicular to each other, and both the second rotation axis B and the third rotation axis C are perpendicular to the transmission path of the image beam L1. The second rotation axis B is perpendicular to the first direction D1 and parallel to the second direction D2.

Further, the first actuating module 140 or the second actuating module 150 shown in FIG. 9 may also be modified to be connected to the projection lens 130, but the disclosure is not limited thereto. In other embodiments, the projection device 100C of FIG. 9 may be a telecentric projection system, and the prism module 160 is arranged between the light valve 120 and the flat plate light-transmitting element 170 on the transmission path of the image beam LI.

Figure 11:
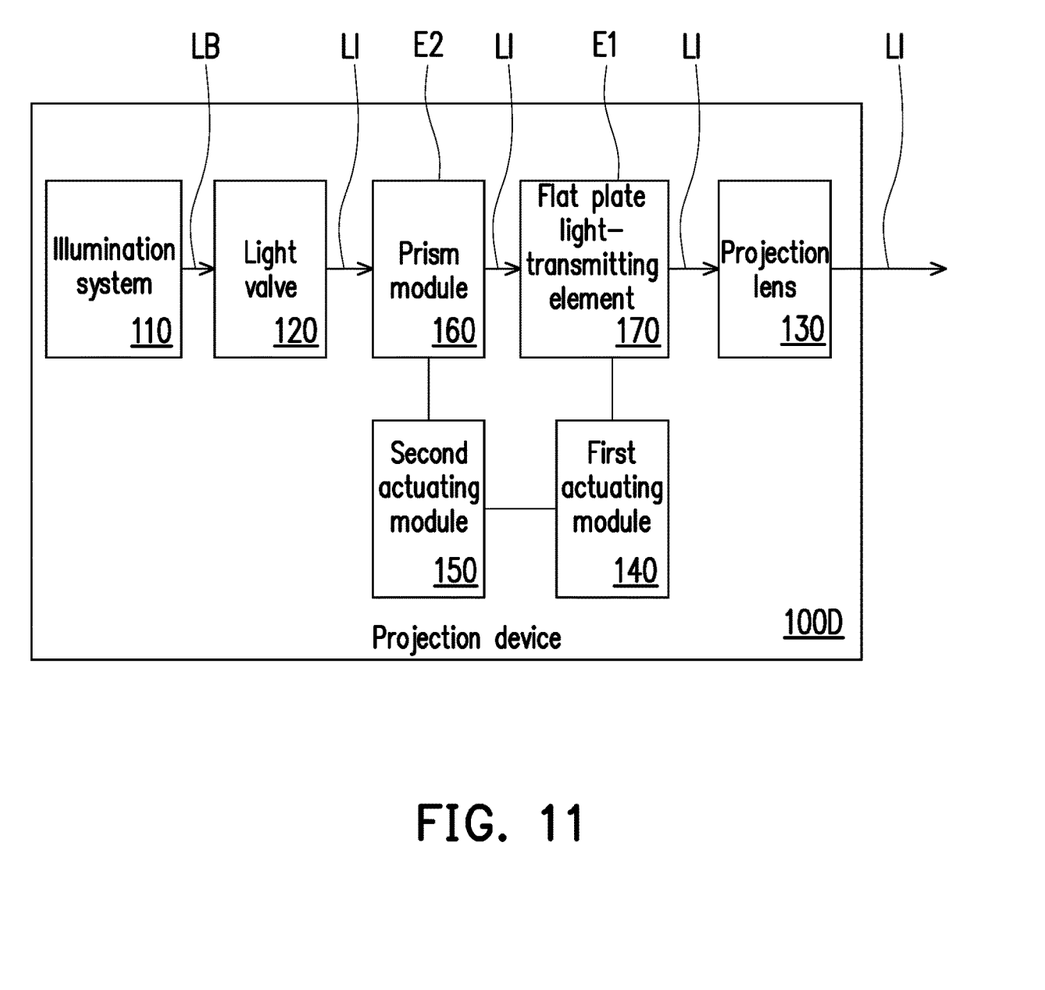
FIG. 11 is a schematic block diagram of a projection device according to another embodiment of the disclosure.

FIG. 11 is a schematic block diagram of a projection device according to another embodiment of the disclosure. Referring to FIG. 11, a projection device 100D of the present embodiment is similar to the projection device 100B shown in FIG. 7. The difference between the two devices lies in that, in the present embodiment, the projection device 100D further includes a flat plate light-transmitting element 170. On the transmission path of the image beam L1, the prism module 160 is arranged between the light valve 120 and the projection lens 130, and the flat plate light-transmitting element 170 is arranged between the prism module 160 and the projection lens 130. The first actuating module 140 is connected to the prism module 160, and the second actuating module 150 is connected to the flat plate light-transmitting element 170. In other words, in the present embodiment, the first element E1 is the prism module 160, and the second element E2 is the flat plate light-transmitting element 170. The prism module 160 is actuated by the first actuating module 140 to oscillate back and forth, and the flat plate light-transmitting element 170 is actuated by the second actuating module 150 to oscillate back and forth. Therefore, the first element E1 and the second element E2 can be oscillated in multiple different directions to change the light path of the projected image beam L1 and increase the resolution of the image, which improves the resolution of the image formed by the image beam LI projected to the projection target by the projection device 100D.

In different embodiments, the first actuating module 140 and the second actuating module 150 shown in FIG. 11 may also be connected to the flat plate light-transmitting element 170 and the projection lens 130 respectively. For example, the first actuating module 140 is connected to the flat plate light-transmitting element 170, and the second actuating module 150 is connected to the projection lens 130. In other words, the first element E1 is the flat plate light-transmitting element 170, and the second element E2 is the projection lens 130. The flat plate light-transmitting element 170 is actuated by the first actuating module 140 to oscillate back and forth, and the projection lens 130 is actuated by the second actuating module 150 to shift back and forth. Therefore, the first element E1 and the second element E2 can be oscillated and shifted in multiple different directions to change the light path of the projected image beam L1 and increase the resolution of the image, which improves the resolution of the image formed by the image beam LI projected to the projection target by the projection device 100D.

In addition to all the embodiments described above, in some embodiments, the optical elements configured for the first actuating module 140 and the second actuating module 150 can be changed according to the design and requirement, and the disclosure is not limited thereto. In different embodiments, the first actuating module 140 and the second actuating module 150 can be exchanged, and the disclosure is not limited thereto.

In all the embodiments described above, the first actuating module 140 and the second actuating module 150 are respectively connected to the first element E1 in the first group G1 and the second element E2 in the second group G2, and through the movement of the first group G1 and the second element E2, the resolution of the original image can be improved several times. For example, if the resolution of the original image is 2716×1528, it can be increased to 7680×4320 (8K), or if the resolution of the original image is 1920×1080, it can be increased to 7680×4320 (8K).

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A projection device, comprising:
   an illumination system configured to provide an illumination beam;
   a light valve arranged on a transmission path of the illumination beam and configured to convert the illumination beam into an image beam;
   a projection lens arranged on a transmission path of the image beam and configured to project the image beam out of the projection device;
   a first actuating module connected to a first element in a first group and moving the first element, so that the image beam shifts back and forth along at least one of a first direction, a second direction, and a third direction respectively; and
   a second actuating module connected to a second element in a second group and moving the second element, so that the image beam shifts back and forth along at least one of the first direction, the second direction, and the third direction respectively, wherein the first direction and the second direction are perpendicular to each other, the third direction and the first direction form an angle of 45 degrees, and the third direction and the second direction form an angle of 45 degrees,
   wherein the first element in the first group is one of the light valve, a flat plate light-transmitting element, a prism module, and the projection lens,
   the second element in the second group is one of the light valve, the flat plate light-transmitting element, the prism module, and the projection lens, and
   the first actuating module and the second actuating module are respectively connected to different elements.

2. The projection device according to claim 1, wherein the first actuating module comprises a first control element and a first driving element, and the second actuating module comprises a second control element and a second driving element.

3. The projection device according to claim 1, wherein the first element in the first group is the light valve, the second element in the second group is the projection lens, the first actuating module is connected to the light valve, the light valve is actuated by the first actuating module to shift back and forth along the first direction and the second direction respectively, the second actuating module is connected to the projection lens, and the projection lens is actuated by the second actuating module to shift back and forth along the third direction.

4. The projection device according to claim 1, wherein the first element in the first group is the light valve, the second element in the second group is the projection lens, the first actuating module is connected to the light valve, the light valve is actuated by the first actuating module to shift back and forth along the third direction, the second actuating module is connected to the projection lens, and the projection lens is actuated by the second actuating module to shift back and forth along the first direction and the second direction respectively.

5. The projection device according to claim 1, wherein the first element in the first group is the light valve, the second element in the second group is the projection lens, the first actuating module is connected to the light valve, the light valve is actuated by the first actuating module to shift back and forth along the first direction and the second direction respectively, the second actuating module is connected to the projection lens, and the projection lens is actuated by the second actuating module to shift back and forth along the first direction and the second direction respectively.

6. The projection device according to claim 1, wherein the first element in the first group is the light valve, the second element in the second group is the prism module, the first actuating module is connected to the light valve, the light valve is actuated by the first actuating module to shift back and forth along the first direction and the second direction respectively, the second actuating module is connected to the prism module, and the prism module is actuated by the second actuating module to oscillate back and forth around a first rotation axis.

7. The projection device according to claim 1, wherein the first element in the first group is the prism module, the second element in the second group is the projection lens, the first actuating module is connected to the prism module, the prism module is actuated by the first actuating module to oscillate back and forth around a first rotation axis, the second actuating module is connected to the projection lens, and the projection lens is actuated by the second actuating module to shift back and forth along the first direction and the second direction respectively.

8. The projection device according to claim 1, wherein the first element in the first group is the light valve, the second element in the second group is the flat plate light-transmitting element, the first actuating module is connected to the light valve, the light valve is actuated by the first actuating module to shift back and forth along the first direction and the second direction, the second actuating module is connected to the flat plate light-transmitting element, and the flat plate light-transmitting element is actuated by the second actuating module to oscillate back and forth around a second rotation axis.

9. The projection device according to claim 1, wherein the first element in the first group is the light valve, the second element in the second group is the flat plate light-transmitting element, the first actuating module is connected to the light valve, the light valve is actuated by the first actuating module to shift back and forth along the third direction, the second actuating module is connected to the flat plate light-transmitting element, and the flat plate light-transmitting element is actuated by the second actuating module to oscillate back and forth around a second rotation axis and a third rotation axis respectively.

10. The projection device according to claim 1, wherein the first element in the first group is the flat plate light-transmitting element, the second element in the second group is the projection lens, the first actuating module is connected to the flat plate light-transmitting element, the flat plate light-transmitting element is actuated by the first actuating module to oscillate back and forth around a second rotation axis and a third rotation axis respectively, the second actuating module is connected to the projection lens, and the projection lens is actuated by the second actuating module to shift back and forth along the third direction.

11. The projection device according to claim 2, wherein the first driving element and the second driving element are voice coil motors, electromagnets or piezoelectric material structures.

* * * * *